United States Patent [19]
Bourne et al.

[11] Patent Number: 5,174,128
[45] Date of Patent: Dec. 29, 1992

[54] ENERGY-SAVING PROTECTED ROOF SYSTEMS

[75] Inventors: Richard C. Bourne; David A. Springer, both of Davis, Calif.

[73] Assignee: Davis Energy Group, Inc., Davis, Calif.

[21] Appl. No.: 699,443

[22] Filed: May 13, 1991

[51] Int. Cl.⁵ .................. F25D 23/12; F25D 17/02
[52] U.S. Cl. .................... 62/373; 62/259.4; 62/DIG. 16; 52/168; 165/45
[58] Field of Search ............ 62/373, 376, DIG. 1, 62/DIG. 16, 235.1, 238.1, 259.1, 259.4; 52/168, 408; 126/432, 430; 165/45

[56] References Cited

U.S. PATENT DOCUMENTS

| | | | |
|---|---|---|---|
| 716,344 | 12/1902 | Myers | 62/259.4 X |
| 964,464 | 7/1910 | Crawford-Frost | 62/259.4 X |
| 2,266,321 | 12/1941 | Holder | 62/259.4 X |
| 2,342,211 | 2/1944 | Newton | 62/235.1 X |
| 2,506,936 | 5/1950 | Murray | 62/259.4 X |
| 2,660,863 | 12/1953 | Gerhart, Jr. | 126/432 X |
| 3,411,256 | 11/1968 | Best | |
| 3,450,192 | 1/1969 | Hay | |
| 3,563,305 | 2/1971 | Hay | |
| 3,957,109 | 5/1976 | Worthington | 62/259.4 X |
| 3,994,278 | 11/1976 | Pittinger | |
| 4,054,691 | 10/1977 | McMillan | |
| 4,064,706 | 12/1977 | Stephens, Jr. | |
| 4,067,164 | 1/1978 | McMillan | |
| 4,082,080 | 4/1978 | Pittinger | |
| 4,193,543 | 3/1980 | Viesturs et al. | 126/430 |
| 4,338,991 | 7/1982 | Sigworth, Jr. | |
| 4,355,682 | 10/1982 | Maloney | |
| 4,739,599 | 4/1988 | Lopez et al. | |
| 4,748,776 | 6/1988 | Yu | 62/DIG. 16 X |
| 4,761,965 | 8/1988 | Viner | 62/249.4 X |
| 4,782,816 | 11/1988 | Salgado et al. | 126/432 X |

FOREIGN PATENT DOCUMENTS

| | | | |
|---|---|---|---|
| 579388 | 11/1977 | U.S.S.R. | 52/168 |
| 643603 | 1/1979 | U.S.S.R. | 52/168 |
| 781297 | 11/1980 | U.S.S.R. | 52/168 |

OTHER PUBLICATIONS

Chen, B. et al., "Evaluation and Testing of the Nebraska Modified Roof Pond for Severe Heating and Cooling Environments," ASES Conference Proceedings, Montreal, Sep. 1985.
(List continued on next page.)

Primary Examiner—Henry A. Bennet
Assistant Examiner—Christopher Kilner
Attorney, Agent, or Firm—Oliff & Berridge

[57] ABSTRACT

A roofing system for a structure having a roof deck with upstanding edges about the perimeter of the roof deck, includes a waterproof membrane on the roof deck and extending from edge-to-edge. A reservoir is defined by the waterproof membrane and edges and may contain a liquid therein, but some embodiments may operate without the reservoir. At least one insulating panel is provided above the liquid reservoir and covers the waterproof membrane on the roof deck from edge-to-edge. A pump has an inlet within the reservoir and an outlet communicating with the surrounding environment for selectively spraying liquid from the reservoir or other source onto the external surface of the panel to cool the liquid in the reservoir. Drains in the panel provide communications between the external surface of the panel and the reservoir for permitting drainage of liquid on the external surface into the reservoir. An overflow drain established a maximum depth of the reservoir, and is located below the external surface of the panel so as not to be clogged by debris. An edge cushion between the edge and the insulation panel is resilient for accommodating reciprocal movement of the panel toward and away from the edge. The roof membrane continuously extends from the roof deck and surrounds an exterior face to the edge cushion extending between the panel and the edge to define the liquid reservoir and seal the roof deck against leakage.

51 Claims, 12 Drawing Sheets

OTHER PUBLICATIONS

Chen, B. et al., "Nebraska Modified Roof Pond: 1985 Summer Performance Results," ASES Conference Proceedings, Denver, Dec. 1986.

Chen, B. et al., "Cooling Performance Curve for the Nebraska Modified Roof Pond," ASES Conference Proceedings, Portland, Feb. 1987.

Kratochvil, J. A., "Modelling of the Radiation, Convective, and Evaporative Heat Transfer Mechanisms of the Nebraska Modified Roof Pond for Determination of Cooling Performance Curves," Thesis Paper, University of Nebraska, Omaha Campus, Mar. 1987.

Cool Roof Brochure Mar. 1990.

"Full Year Performance Simulation of a Direct-Cooled Thermal Storage Roof (DCTSR) in the Midwest", Richard C. Bourne and Dr. Bing Chen Sep. 1989.

Technical Data Sheet, Roofs, "Protected Membrane Roofing" Oct. 1988.

Dow TechNote T 222, Mar. 1991, "Installing STYROFOAM Brand Roofing Materials in IRMA Roofing Systems".

Dec. 1991 Products and Specifications, "STYROFOAM Brand Insulation for Roofs, Walls, and Foundations".

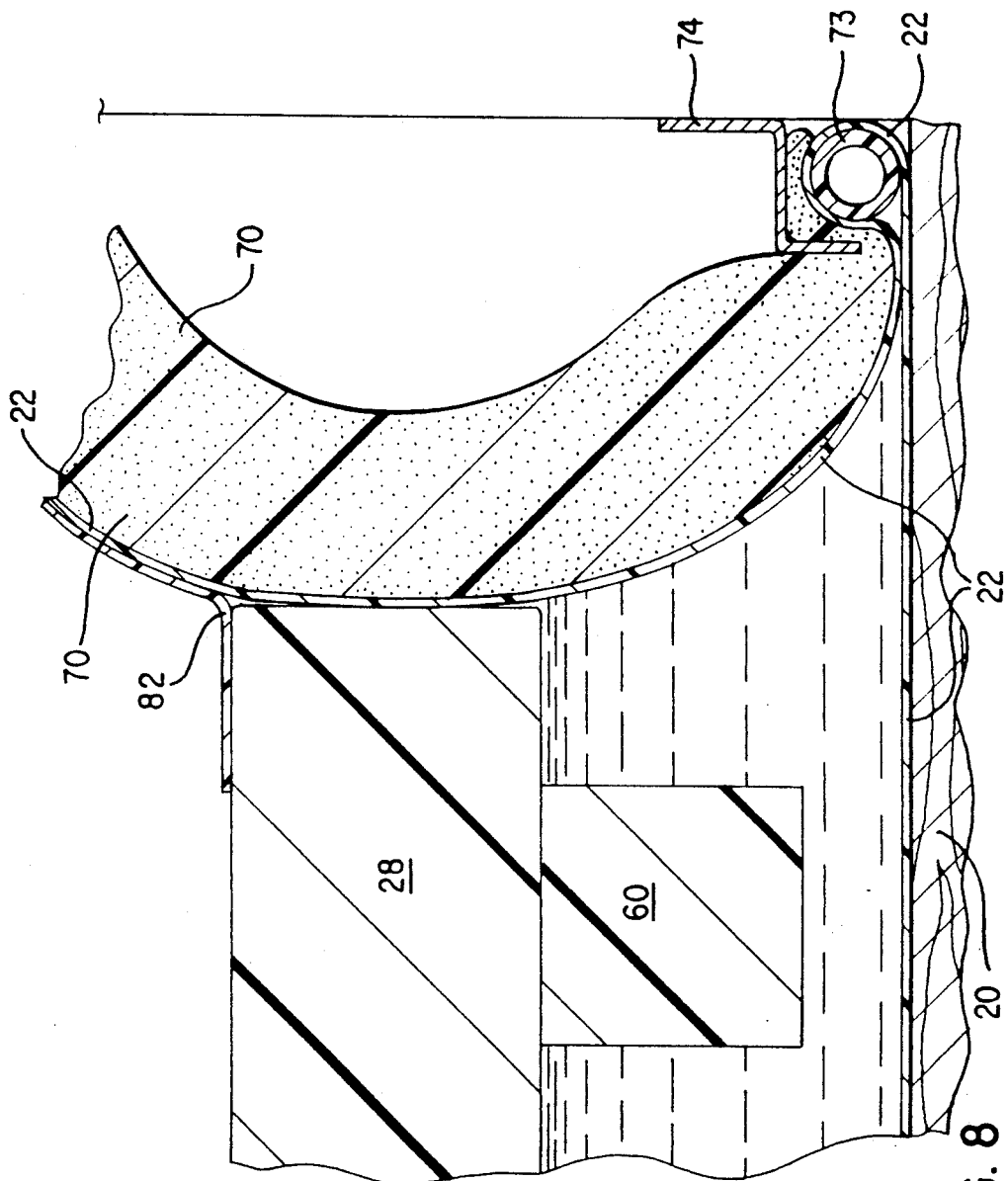

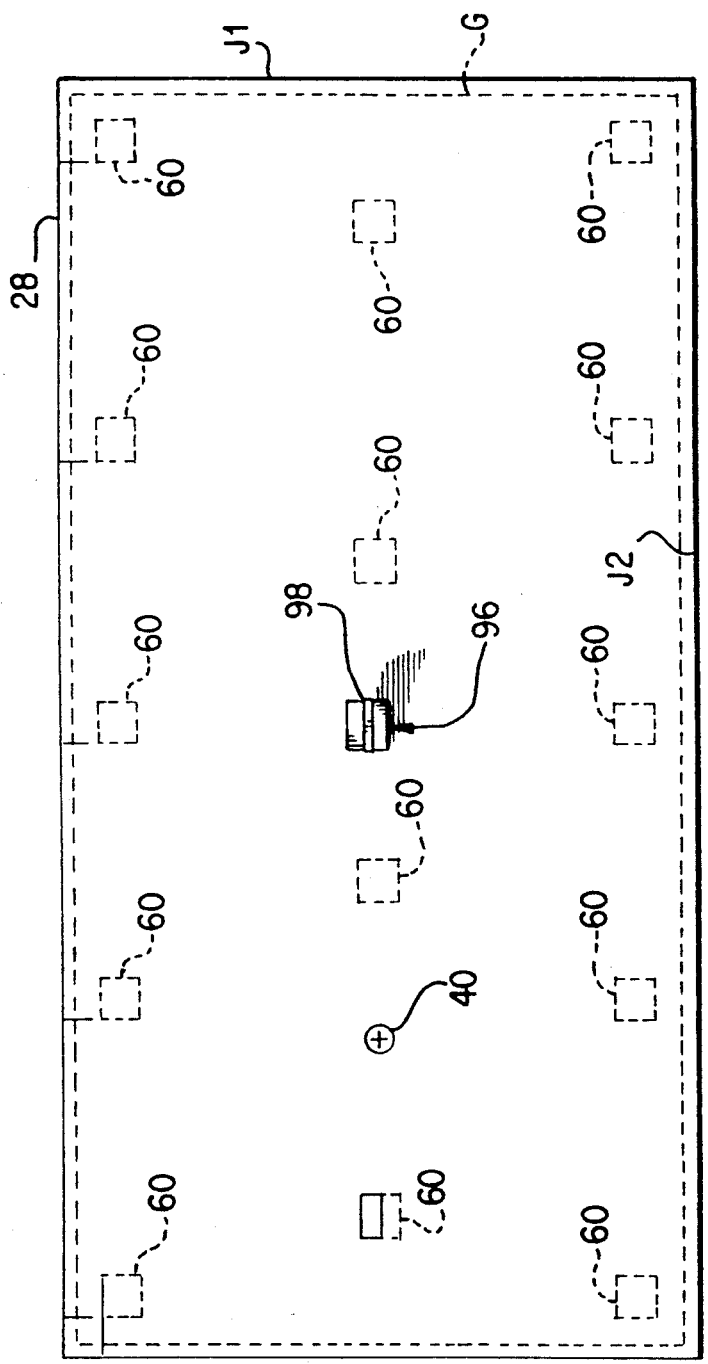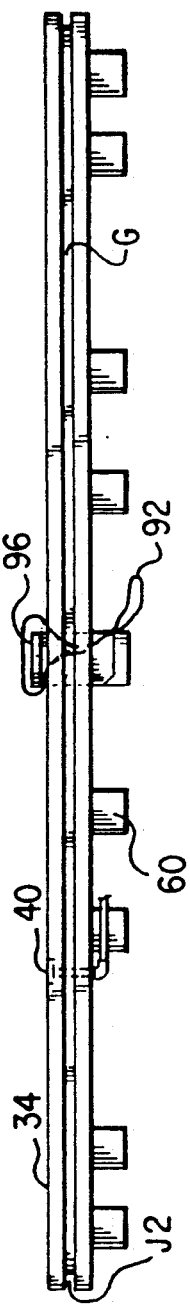

ENERGY-SAVING PROTECTED ROOF SYSTEMS

BACKGROUND OF THE INVENTION

The invention relates to an energy saving protected roof system which reduces cooling costs and extends roof life expectancy over conventional roofing through the use of a waterproof surface located below interlocking insulation panels constrained between structural edges with drains located beneath the insulation panels. In a preferred embodiment, the panels float on a water reservoir contained by the waterproof surface with the water cooled by circulation above the insulation panels at night.

Conventional roofing for commercial and industrial buildings (see FIG. 1) usually consists of a roof deck 10 covered by a layer of insulation 12 followed by a waterproof membrane 14 and an exterior surface, usually gravel 16. Conventional roofing suffers many inherent problems. Solar radiation can heat a roof surface up to 180° F. which when coupled with nighttime temperatures that can range to below 0° F., subject a conventional roof to extreme temperature change cycles which can shrink, expand, soften or harden roofing, thereby seriously degrading roofing structures over time. Additionally, rain can cause frequent wet/dry cycles on the roofing structure and wind can cause surface erosion and other deterioration of the roof structure by blowing sharp objects against the roof membrane. Further, conventional roofing suffers many problems involving undesirable heat transfer in that the interior of the structure becomes hot due to high roof temperatures or cold due to heat loss through the roof.

Protected membrane roofs (PMR's) have been developed to extend the life of roof membranes via placement below an insulation layer, protecting the membrane from sunlight and extreme temperature changes. For example, the Dow Chemical Co. has developed an inverted roof membrane application (IRMA and insulating panels (see U.S. Pat. Nos. 3,411,256; 4,054,691; 4,067,164; and 4,739,599). PMR's use rigid insulation panels which will not absorb moisture, maintaining their insulating properties even in wet weather. The insulating panels are typically ballasted with gravel or an integral layer of concrete. The ballast protects the panel plastic foam material from ultraviolet degradation, and resists wind uplift. PMR's have not been widely successful due to high costs related to ballasting the panels and providing additional restraints against wind uplift. PMR's also fail to prevent wet/dry cycling which contributes to membrane degradation.

The prior art also describes certain insulation materials and constructions to reduce cooling and heating costs of a building through the use of a liquid medium directly located on a building structure which can be heated or cooled through solar radiation and other means. For example, U.S. Pat. Nos. 3,450,192 and 3,563,305, both Hay, disclose processes and apparatus for modulating the temperature within a water-jacketed enclosure.

U.S. Pat. Nos. 3,994,278 and 4,082,080, both to Pittinger, discloses heating and cooling systems which utilize energy as an energy source and a fluid body as a storage medium. The fluid body is distributed over the roof of a dwelling and includes mechanisms for regulating the temperature within the enclosed structure.

However, all four of the referenced patents "closed" water containment systems are designed primarily for solar heating. The water containment systems are placed on a primary roof membrane for thermal storage containment.

The prior art references have some disadvantages which have not been overcome. Firstly, since a closed liquid system is used, optimum cooling efficiency cannot be obtained since no evaporative cooling can be accomplished. Secondly, the references fail to provide an improved roofing exterior with respect to longevity, durability, etc. The plastic or glass cover provides minimal protection from the elements such as severe wind storms, hail, heavy rains, fallen debris, etc.

SUMMARY OF THE INVENTION

It is an object of the invention to provide a more durable and reliable roof system which obviates the disadvantages of the prior art.

It is a further object of the present invention to provide a roof system which improves building thermal performance and improves the life expectancy of the roof.

These and other objects and advantages are obtained by the roof systems according to the present invention. The system includes:

a waterproof membrane on the roof deck with structurally-supported upturned edges at the perimeter and around penetrations;

at least one insulating panel covering the waterproof membrane on the roof deck from edge-to-edge;

drain means in the panel and providing communication between an external surface of the panel and the membrane for permitting drainage of liquid on the external surface and the membrane; and overflow drain means located below the external surface of the panel, protecting the overflow drain means from clogging due to roof debris. In one embodiment, a resilient edge seal is provided between the panel and the edges to accommodate expansion and contraction of the panels. In another preferred embodiment, a water reservoir is provided between the membrane and the panels so that the panels float.

The preferred roofing system in accordance with the present invention improves roof durability and life expectancy because the insulation panels maintain generally constant conditions between the panels and the membrane (or within the reservoir), rather than the hot/cold and wet/dry cycles experienced by conventional roofs, while preventing clogging of roof drains. The preferred system also reduces cooling costs 50-90% on commercial, institutional and industrial buildings through night evaporative and radiative cooling of the water reservoir, minimizing roof temperature variations and decreasing heat transfer from the roof to the interior of the structure.

BRIEF DESCRIPTION OF THE DRAWINGS

The invention will be described in detail with reference to the following drawings in which like elements bear like reference numerals and wherein:

FIG. 8 is an enlarged cross-sectional view of the structure of FIG. 7;

FIG. 9 is a top view of a sample panel;

FIG. 10 is a longitudinal edge view of the panel of FIG. 9;

FIG. 11 is a lateral edge view of the panel of FIG. 9;

FIG. 12 is an end view of a spline for insertion in the edge grooves of the panels of FIGS. 10 and 11;

DETAILED DESCRIPTION OF THE PREFERRED EMBODIMENTS

Figure 1:
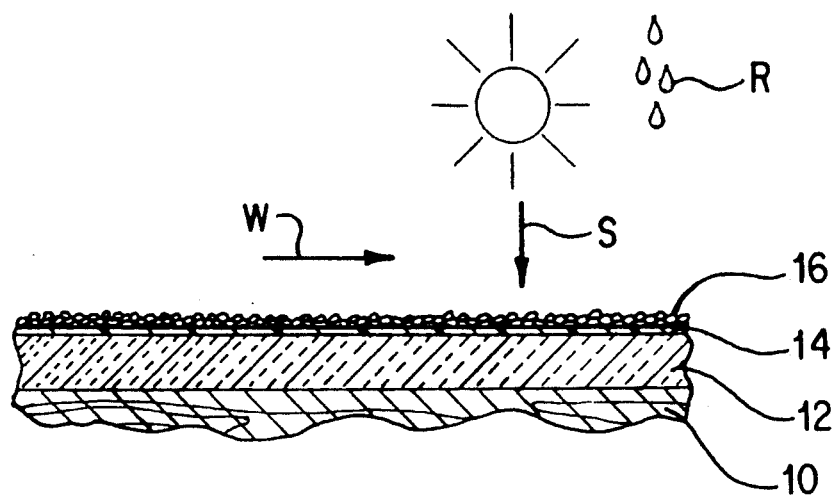
FIG. 1 is a schematic illustration of a conventional roof.
Figure 2:
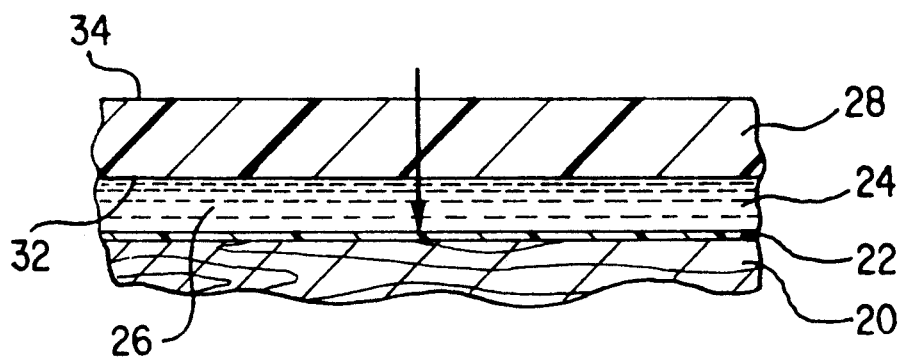
FIG. 2 is a schematic illustration of a preferred embodiment of the roofing system in accordance with the claimed invention.

The cooling roofing system (FIG. 2) includes a waterproof membrane 22 located on the roof deck 20. The waterproof membrane preferably is of polyvinyl chloride (PVC) material.

A reservoir 24 is defined by the waterproof membrane 22 and edges 30 (see FIGS. 6-8) for containing a liquid, preferably water 26, to a depth of preferably 3.5 inches. The waterproof membrane 22 extends from edge-to-edge and seals the roof deck to prevent leakage of water into the structure. Other embodiments of the invention without the water reservoir are described with reference to FIGS. 16-18.

At least one insulating panel 28 floats in the liquid reservoir and covers the waterproof membrane 22 on the roof deck 20 from edge-to-edge. The panel 28 has a reservoir surface 32 (or underside surface) in contact with the water 26 and an external surface 34 opposite the reservoir surface for facing the external environment. The exterior surface 34 is white to reflect solar energy. Preferably, a plurality of insulating panels are employed, as illustrated in the typical layout of FIG. 6. Each panel preferably has a "spline-in-grooves" or other interlocking edge structure (see FIGS. 9-12) for interconnection with the edge of an adjacent panels. Each panel is preferably 8 feet long and 4 feet wide, with a thickness of preferably 3 inches. The panel 28 is preferably made of extended polystyrene to prevent panel moisture absorption. Each panel 28 includes a protective layer on the external surface (preferably a durable acrylic paint) to protect the panel 28 from ultraviolet degradation.

Figure 3:
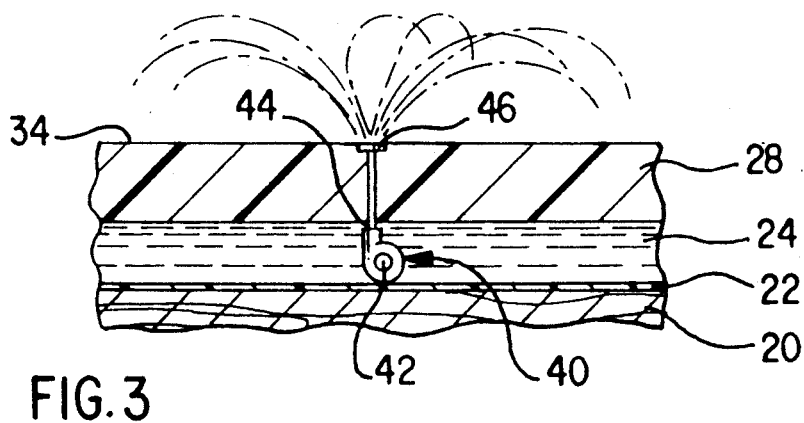
FIG. 3 is a schematic illustration of the inventive roofing system during off-peak hour operation (nighttime)

A pump 40 (FIG. 3) in the reservoir 24 is provided for selectively spraying liquid from the reservoir 24 onto the external surface 34 of the panel 28. The pump has an inlet 42 in the reservoir 24 and an outlet 44 communicating with the environment outside of the external surface 34. The outlet 44 preferably communicates with a spray head 46 for spraying the liquid onto the external surface of the panel 28. The spray head 46 may be flush mounted into the external surface 34 of the panel 28. The pump 40 may be associated with a filter 51 (FIG. 6A) to maintain clean water and protect the spray heads 46 from being clogged by small debris. Drains are also provided in the panels 28 to allow the liquid to flow back through the panel to the reservoir. The drain may be a joint J (see FIG. 6) between the panels 28 or a slit 98 (see FIG. 9) in the panel. Filters (not shown) may be provided in the drains for preventing entry of debris into the reservoir. Alternatively, the joints J or slits 98 may have a predetermined size to prevent passage of debris having a size larger than the predetermined size. The pump 40 may also selectively communicate with a water source 144 (FIG. 6A) for adding water to the reservoir should the reservoir depth fall below a predetermined depth (described below with reference to FIG. 15).

Figure 4:
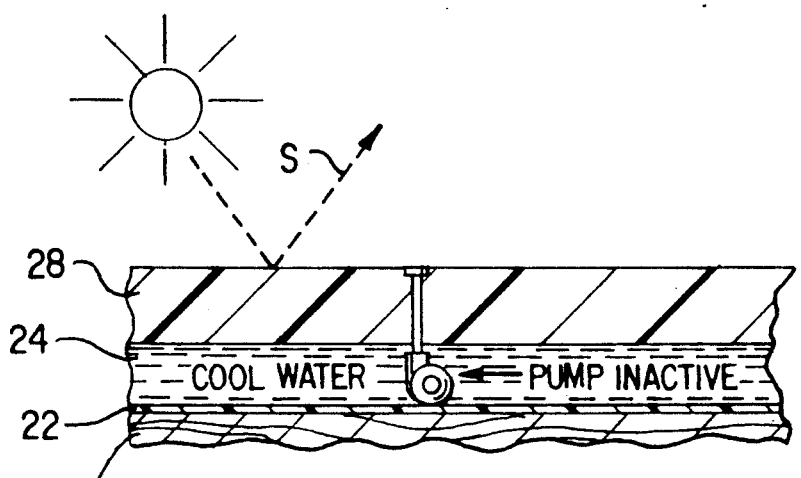
FIG. 4 is a schematic illustration of the inventive roofing system during peak hour operation (daytime.
Figure 5:
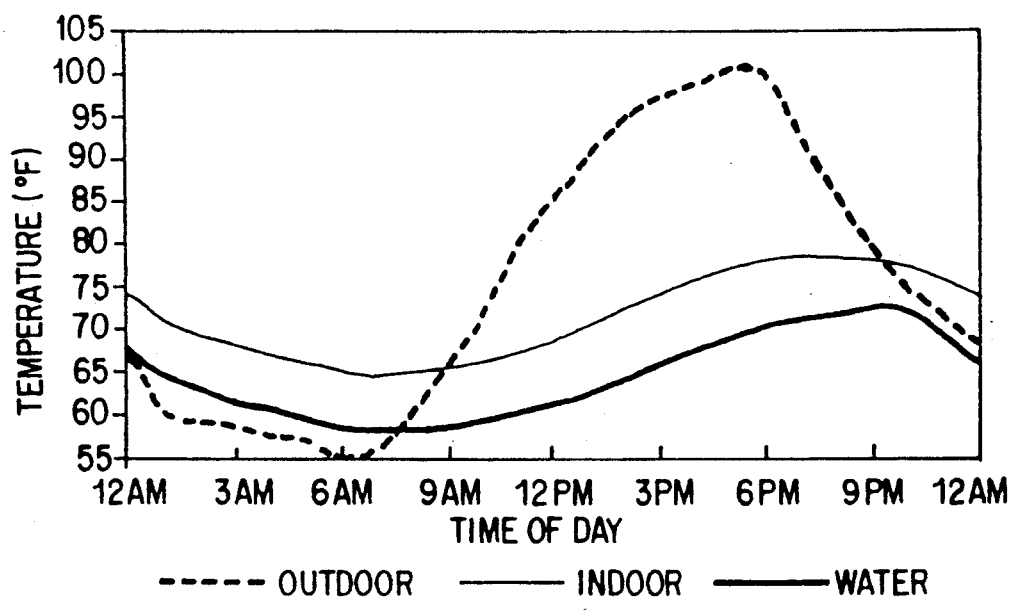
FIG. 5 is a graph illustrating typical temperatures versus time-of-day for the environment, interior and reservoir.

In operation, the insulating panels 28 reflect solar energy S during daytime as illustrated in FIG. 4, and thermally insulating the reservoir and maintaining the reservoir at a relatively cool temperature. For example, FIG. 5 illustrates an outdoor temperature of about 100° F. between 3 and 6 p.m., whereas the reservoir temperature is only in the range of 65°-75° F. The interior of the structure is thus thermally protected from roof heat gains that would normally result with conventional roofs. At nighttime or other predetermined times (FIG. 3), the pump 40 is activated by a time controller 41 (FIG. 6A) to spray filtered water upwardly onto the external surface 34 of panel. The liquid is cooled by evaporation and flows back to the reservoir through drains in the panels to chill the reservoir. If necessary, the reservoir can be provided with mechanical chilling mechanisms 43 (FIG. 6) for conveying a cooling fluid through a cooling delivery conduit 45. The mechanical chilling mechanism 43 may be operated when necessary if the evaporative cooling is not sufficient to reduce the reservoir temperature to the desired range. Moreover, the mechanical chilling may be coupled with the evaporative cooling to provide evaporative cooling at night followed by "prepeak" mechanical chilling if necessary.

Cooling of the structure is enhanced in several ways. "Direct" cooling can be accomplished if the roof deck is exposed to the occupied interior space so that the reservoir is in heat exchange relationship with the interior of the structure. "Plenum" cooling can be accomplished by passing air conditioning return air along the underside of the roof deck to obtain a heat exchange relationship with the cool reservoir, thereby cooling the return air. "Fan coil" cooling can be accomplished by pumping the reservoir water through heat exchange coils in heat exchange relationship with components of the air conditioning system of the structure.

The roof system also provides other advantages to the structure. The roof membrane is protected against damage by the panels 28, which also keep relatively constant temperature and wetness conditions in the reservoir (as opposed to the conventional roof which suffers through hot/cold cycles and wet/dry cycles). The reservoir can also be accessed in the of event of fire. For example, the reservoir may communicate with the interior fire sprinkler system 47 (FIG. 6A) of the building to supply water to that system in the event of fire. The controller 41 opens the valve 471 to supply reservoir water to the sprinkler 47.

Figure 6:
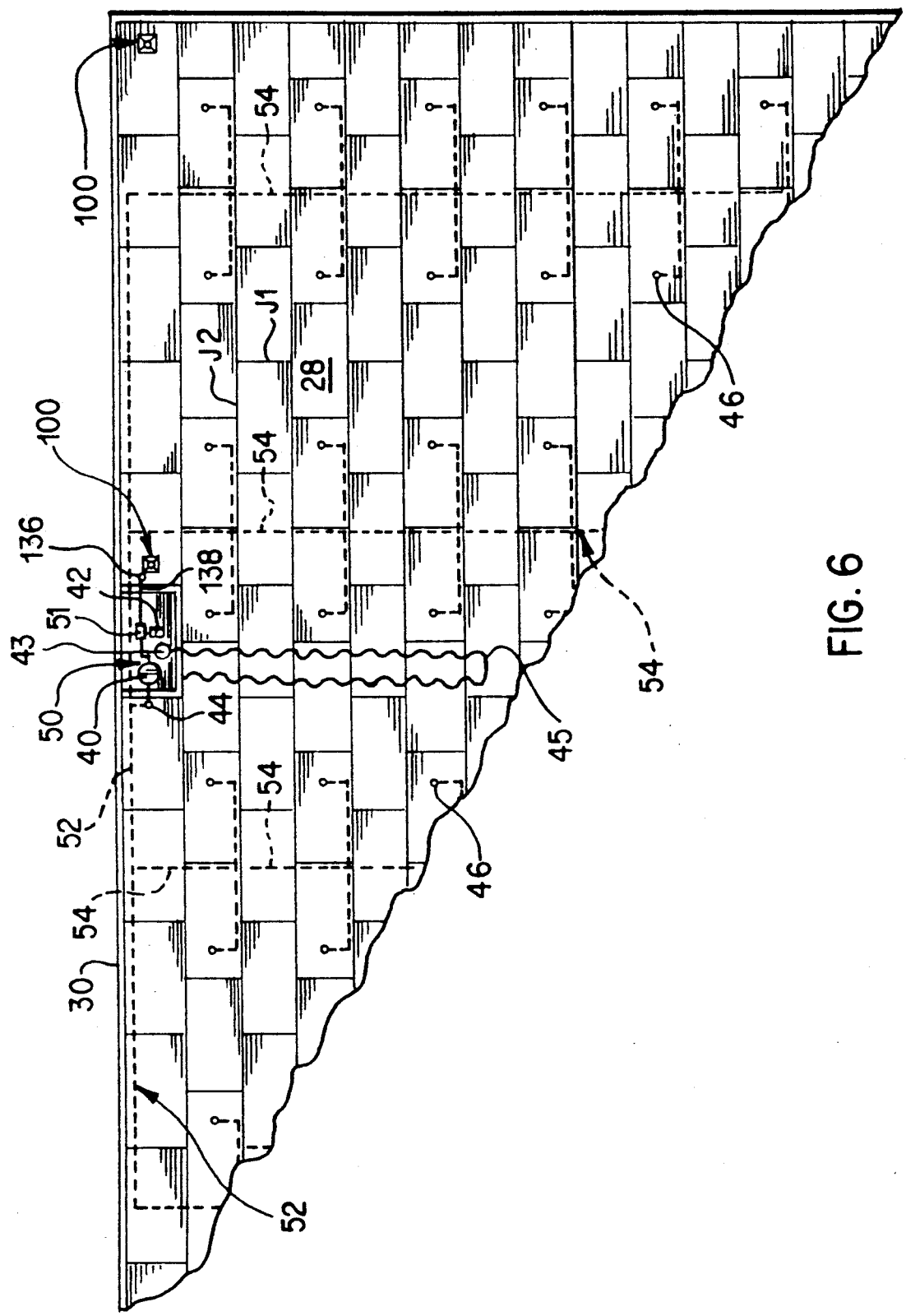
FIG. 6 is a cut-away top view of a roof illustrating a typical layout for the inventive roofing system.
Figure 6A:
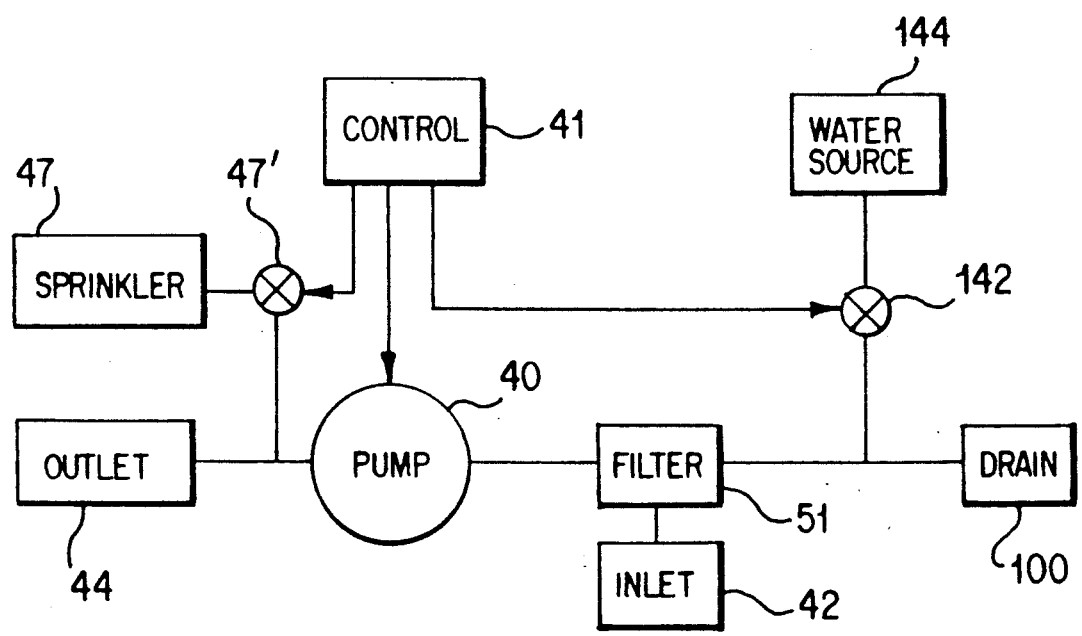
FIG. 6A is a schematic block diagram illustrating the control system for various elements of the roofing system.

FIG. 6 illustrates a typical layout for the roofing system. The roof deck (not shown in FIG. 6) is surrounded on its perimeter by edges 30. A plurality of panels 28 float on the liquid reservoir and are interconnected by spline and groove edges preferably to define lateral joint J1 and longitudinal joint J2. Preferably, the panels are interconnected to increase their rigidity by having a lateral joint J1 intersect a longitudinal joint J2 to offset the lateral joints J1. The pump 40 and its filter are located on a pad 50 elevated above the reservoir. The pump communicates with a primary spray head manifold 52 extending along the edge 30. The primary spray head manifold communicates with a plurality of secondary spray head manifolds 54, each of which communicates with a plurality of spray heads 46 in selected panels.

Figure 7:
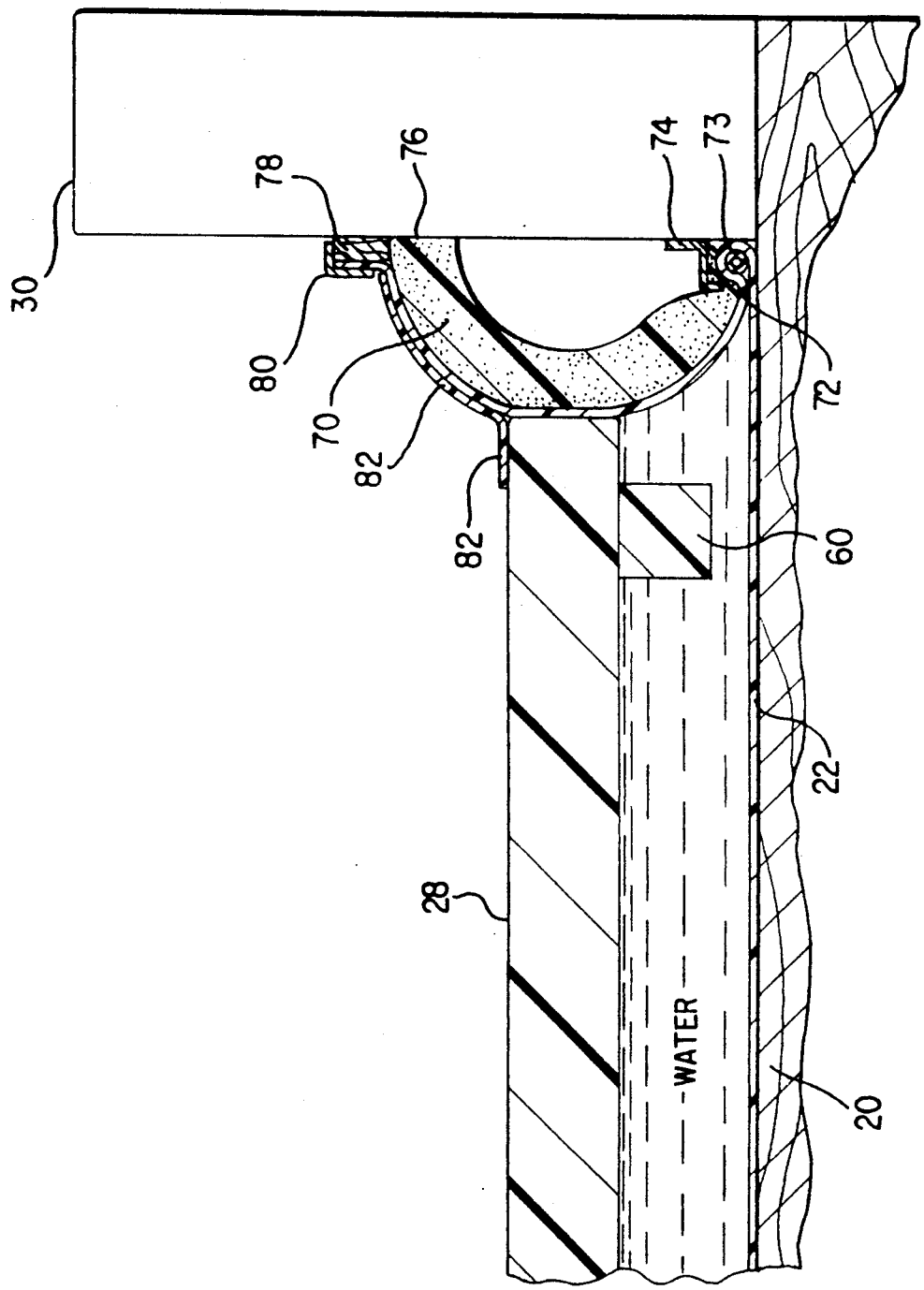
FIG. 7 is a cross-section view of the roof and edge of the structure with the inventive roofing system.

FIG. 7 illustrates details of the panels and resilient seals adjacent the edges. Each panel 28 is preferably provided with a plurality of feet 60 or standoffs projecting from the reservoir surface of the panel, preferably for a distance of about 2½ inches. The feet 60 are arranged on the reservoir surface at predetermined locations (see FIG. 9) to provide space for the manifolds 52,54, and to facilitate alignment during panel installation.

An edge cushion 70 is located between the edge 30 and the panel 28. The edge cushion 70 is preferably a resilient material, for example a foam pad, to accommodate contraction and expansion of the panels. One end 72 of the edge cushion is held at the base of the building edge by a continuous "Z-strip" 74, while the opposite end 76 extends above the panel 28 where it is held against the edge by a batten 78. Preferably, the edge cushion is held in convex curvature, which when coupled with its resiliency, permits the edge cushion to compress toward the edge as the panels expand, and expand away from the edge as the panels contract. Alternatively, edge seals may be integrally mounted at the panel edges rather than the building edges.

As illustrated in FIG. 8, the roof membrane 22 continuously extends from the roof deck 20, around the holding tube 73 and over the exterior face of the edge cushion where it is fixed to the batten 78 by an exterior bracket 80, thus defining the reservoir and preventing leakage into the structure. Also, an additional seal 82 may be provided for covering the joint between the panel and membrane 11 wrapped over edge cushion 70.

FIG. 9 illustrates the location of the spray head 40 in the panel 28, and FIG. 10 shows that the spray head is flush mounted in the exterior surface 34 of the panel 28. FIGS. 10 and 11 illustrate the lateral and longitudinal joints J1, J2, each defined by an edge having a groove G. A spline or tongue T (illustrated in FIG. 12) is located in adjacent grooves to interconnect the panels 28.

Figure 13:
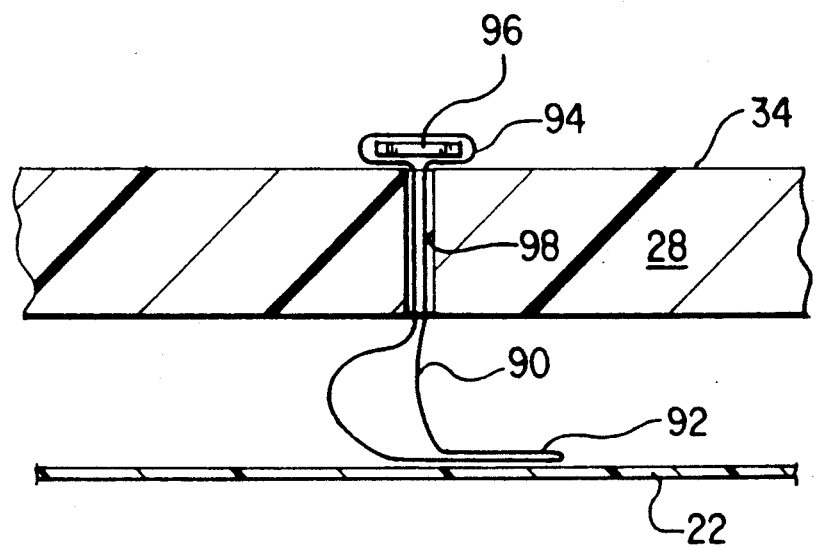
FIG. 13 is a schematic view of a tie-down mechanism for the panel.

FIGS. 9, 10 and 13 also illustrate a mechanism for securing the panel 28 to the roof membrane 22. Under normal conditions when the reservoir is full, liquid adhesion between the liquid 26 and reservoir surface 32 of the panel is sufficient to prevent lift-off of the panel in high winds. However, some code authorities may require additional tie-down mechanisms to prevent lift-off when the reservoir is empty.

An illustrative tie-down mechanism (FIG. 13) includes a looped strap 90 having one looped end 92 secured to the roof membrane 22 and an opposite looped end 94 which holds a rigid plate 96. Preferably, the strap 90 is a PVC strap which can be secured to the roof membrane 22 by solvent or heat seam. A slit 98 (preferably about ⅛ inch wide and 3 inches long) is cut in the panel so that the plate 96 and strap 90 are pushed up through the slit 98 from below to locate the plate 96 on the exterior surface 34 of the panel 22. The strap 90 can then be drawn back from below so that the plate 96 lies on the external surface 34 and cannot pass back through the slit 98, thus securing the panel 28 to the roof membrane 22.

Most advantageously, the slit 98 is located in the center of the panel 28 (see FIG. 9) because the panels 28 "cup" slightly (i.e., the edges curl up) during night cooling due to the external surface being cooler than the reservoir surface. As a result, some water remains on the external surface, and can evaporate without contributing to reducing the reservoir water temperature. By locating the slit 98 in the center of the panel 28, the slit 98 acts as a center drain at the lowest area of the panel. The liquid drains around the strap which allows almost all the sprayed water to return, thus minimizing water use.

Figure 14:
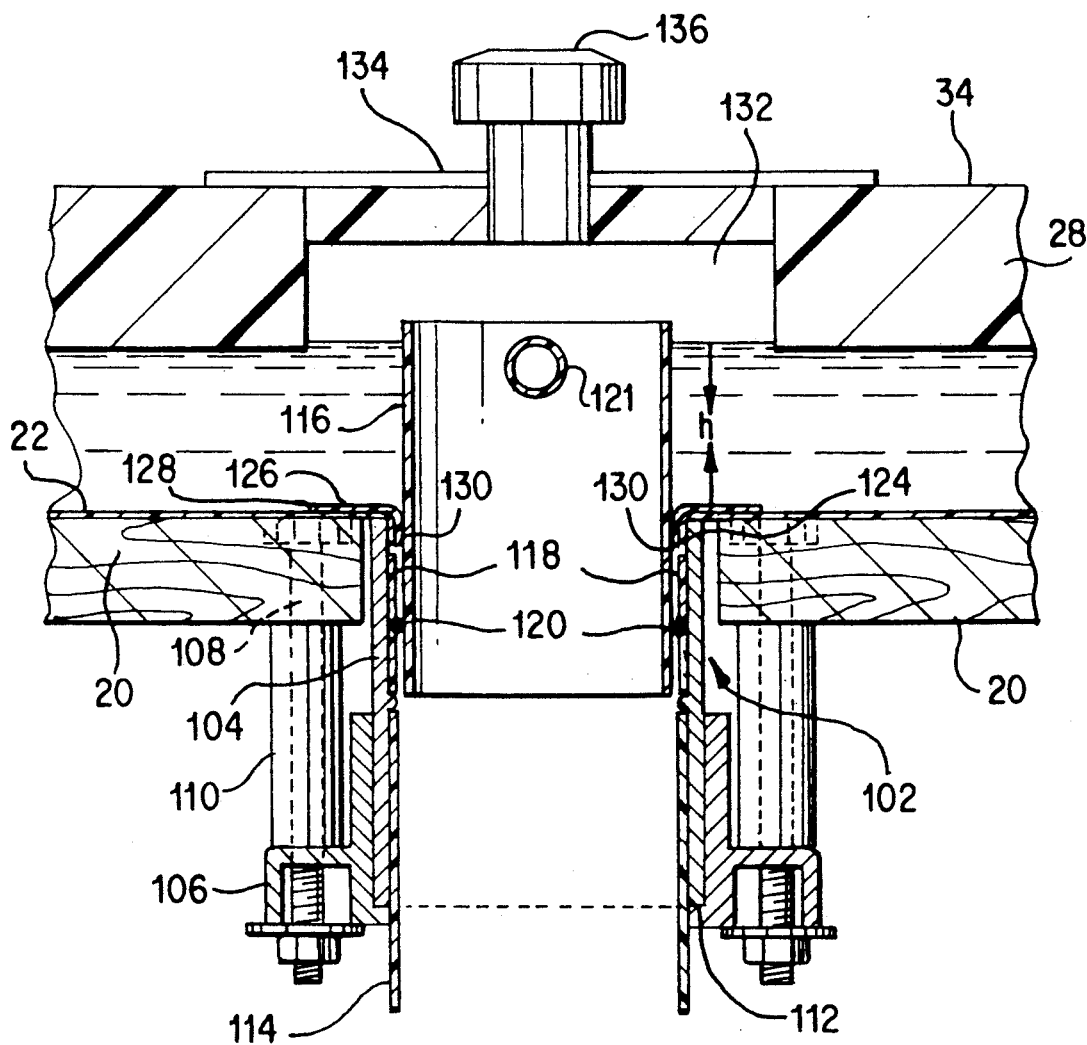
FIG. 14 is a cross-sectional view of one embodiment of the overflow drain mechanism.

FIG. 14 illustrates a preferred embodiment of the overflow drain mechanism 100. The roof deck 20 includes an aperture 102 for the drain, the aperture either being cut into the roof deck either before or after installation or located in a joint between adjacent panels of the roof deck. Two drain mechanisms 100 are illustrated in the typical layout of FIG. 6. A coupling 104 is located in the aperture 102 and is held in place by holders 106 secured by bolt 108 and spacers 110. The holders 106 have a ledge 112 on which one end of the coupling rests. The lower portion of the coupling 104 communicates with a drainage system 114 for the structure.

The upper portion of the coupling 104 holds the overflow drain pipe 116, which is preferably cylindrical and has a diameter (or width) corresponding to the width of the coupling. The drain pipe 116 is held in the coupling 114 by an O-Ring 120 located between the spacers 118 and drain pipe 116. The drain pipe, however, may be pulled out of or pushed into the coupling 114 by grasping the handle 121 to adjust the height h of the drain pipe above the roof deck, thus establishing the maximum depth for the reservoir. Should the level of the reservoir rise due to excess rainfall, excess liquid in the reservoir will flow over the top edge of the drain 116 and into the drainage system. In the event the reservoir must be drained quickly, the drain pipe 116 may be removed from the coupling, thereby emptying the reservoir.

The roof membrane 22 also has an aperture in it at a position corresponding to that of the roof deck aperture 102. An edge 124 of the roof membrane 28 extends from the roof deck 28 into the coupling 104. Preferably, the spacer 118 is located against the edge 124. A secondary sealing membrane 126 is provided to further protect against leakage. The secondary sealing membrane 126 has a first edge 128 located on the roof membrane 28 and a second edge 130 located within the coupling, preferably for location between the spacer 118 and drain pipe 116, thus maximizing the seal at the roof deck aperture 102.

The drain mechanism 100 is located below external surface 34 of the panels 28, so that debris cannot enter or clog the drain mechanism 100. Preferably, the panel 28 above the drain mechanism 100 includes an air opening 132 into which the overflow drain means extends. The air opening 132 is covered by a cap 134 to prevent entry of debris. The cap 134 has an inlet vent 136 to allow air flow between the exterior environment and the drain.

The drain mechanism 100 should not clog since it is located below the panel 28. The filters for the pump and panel drain also prevent entry of debris into the system. Periodically, however, at least the pump filter 51 needs to be backwashed to clean it. In an advantageous construction, the pump filter 51 is located near a drain mechanism 100 (see FIG. 6) and the cap 134 for the air opening 132 in the panel includes a conduit 138 (FIG. 15) for directing filter backwash into the drain mechanism 100. The backwash cycle is controlled by the timing controller 41 to periodically activate the pump 40 in a reverse mode to draw liquid from the reservoir and direct it backwards toward the pump filter 51 to clean it, with the backwash flowing into the drain mechanism 100.

Figure 15:
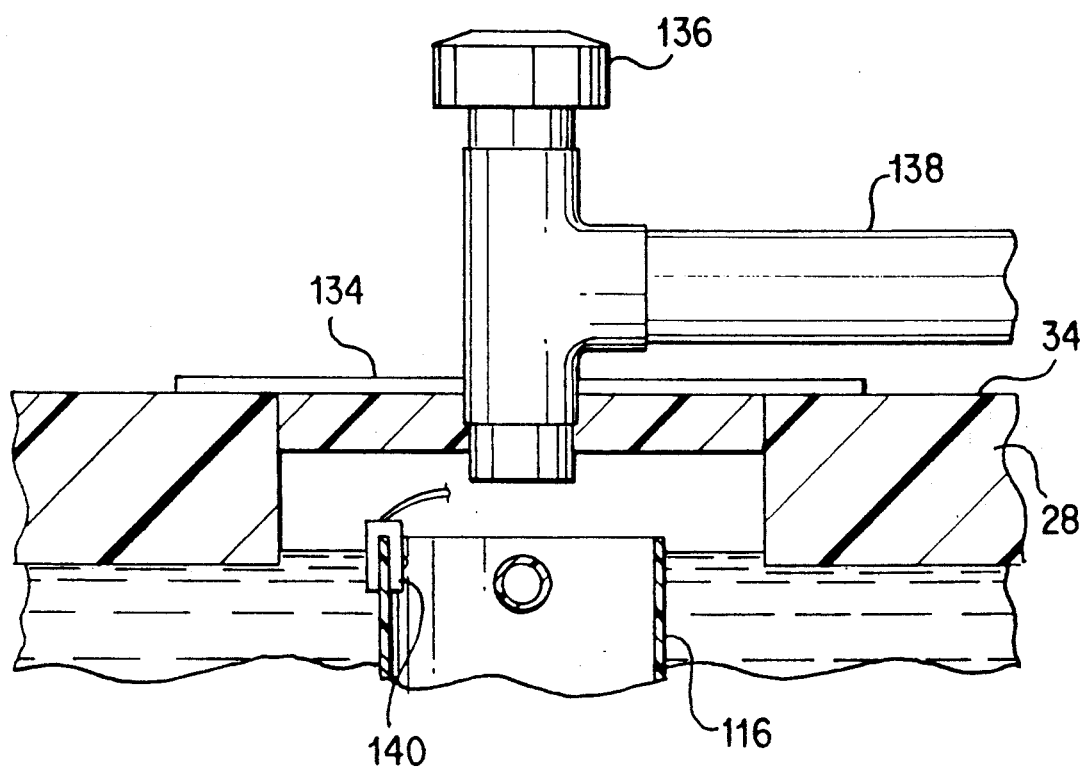
FIG. 15 is a cross-sectional view of another embodiment of the overflow drain mechanism.

FIG. 15 also illustrates a liquid level sensor 140 which is preferably mounted on the drain pipe 116. The sensor 140 forwards a refill signal to the time controller 41 when the liquid depth is below a predetermined depth. The time controller can then open a valve 142 of a liquid source 144 in response to detection of the refill signal, to supply additional liquid to the reservoir. The liquid level sensor 140 can also output a stop signal when the liquid level returns to the predetermined level, the time controller then closing the valve 142 in response to the stop signal. Alternatively, the time controller can activate the valve 142 for a predetermined time in response to the refill signal, and deactivate the valve after the predetermined time.

Aspects of the invention are even applicable if the roof system is used without the liquid reservoir. The roof membrane 22 prevents roof leakage, and the panels 28 (now resting with their feet on the roof membrane) protect the roof membrane from impact and ultraviolet degradation. Moreover, the drain mechanism 100 remains protected against clogging since it is below the insulation panels 28 and edges are sealed against entry of debris.

For existing buildings with sloping roofs, this alternate embodiment of the energy-saving protected roof system provides improved panel hold down features without water containment on the roof, and optional coupling of a night cooling system with a separate chilled water storage reservoir. The system includes the waterproof membrane, panels and overflow drain described herein, but does not contain a water reservoir.

Figure 16:
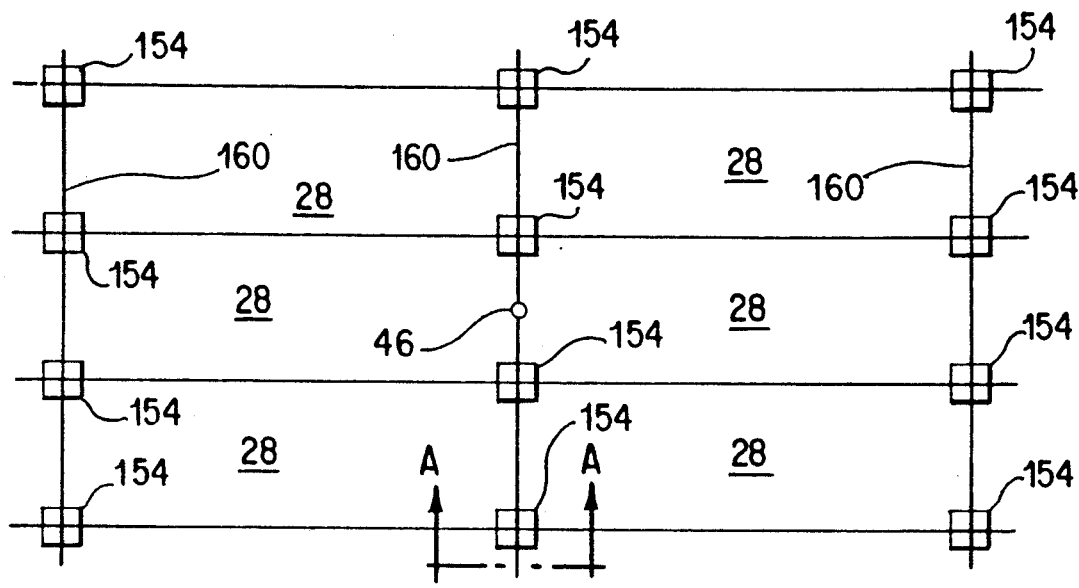
FIG. 16 is a plan view of an alternate embodiment without the water layer, for sloping roofs.
Figure 17:
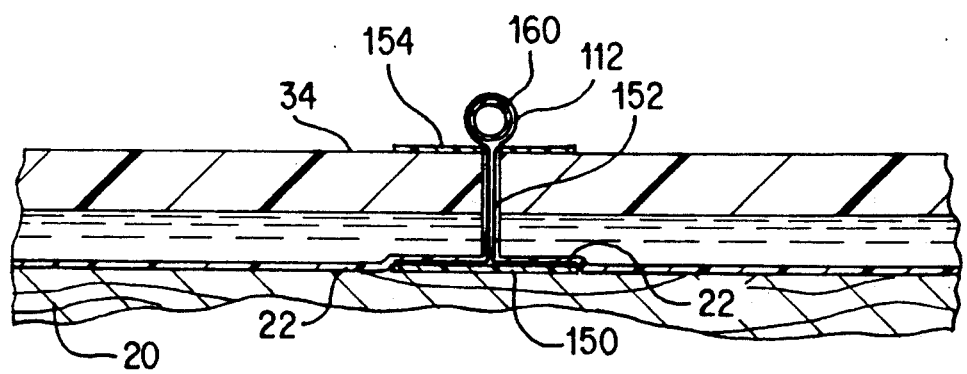
FIG. 17 is a cross-sectional view of the tie-down mechanism for the embodiment of FIG. 16.

FIGS. 16 and 17 show plan and sectional views, respectively, of the alternate embodiment with large (4' by 12') insulating panels 28 placed atop the roof membrane 22. As shown in FIG. 17, rigid PVC plates 150 may be secured to the roof deck 20 beneath the panel intersection points. The PVC roof membrane 22 may then be solvent- or heat-steamed to the plates, effectively securing the membrane 22 to the deck below each panel intersection. Flexible PVC straps 152 are heat- or solvent-welded to the top side of the membrane above the plates 150. The straps 152 extend upward between the panels 28 through slotted rigid PVC or other durable hold-down plates 154. Thus, each plate 154 may hold down the corners of four panels, and each panel may be held down at all four corners.

FIGS. 16 and 17 also show the optional spray cooling system which may be integrated with the panel hold-down system. For an optimal grid of spray heads located on 12, centers, water distribution pipes 160 may rest on the hold-down plates 154 and be held by the same straps 152 which secure the hold-down plates 154 to the roof membrane. FIG. 17 shows how each strap 152 may extend through the slotted plate 154, and around the distribution pipe 160. A short "snap-on" section 162 of PVC pipe, with open circumference, may be placed over the exposed top of the strap 152, around the distribution pipe 160, to provide the strap added protection from ultraviolet degradation.

Figure 18:
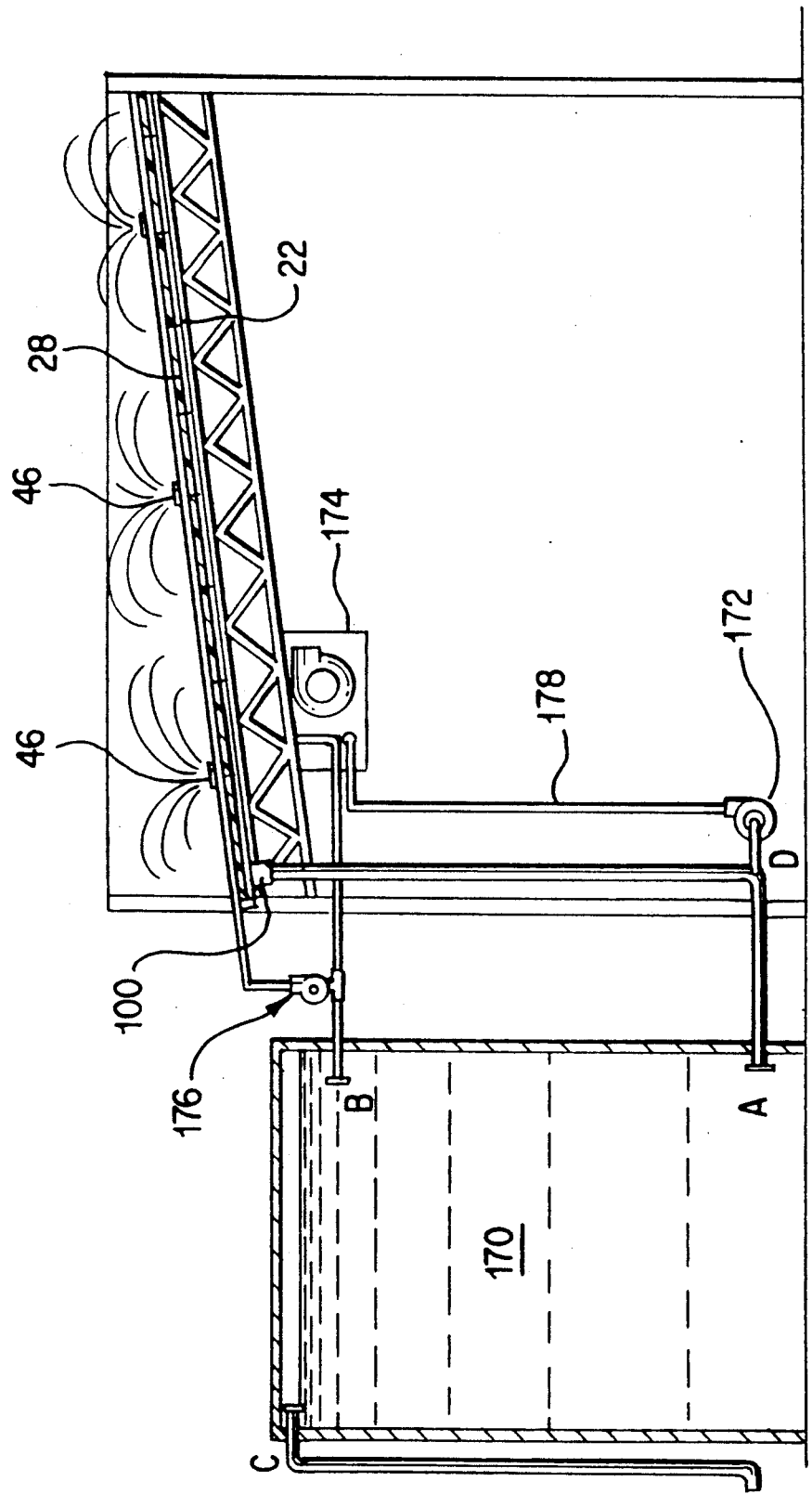
FIG. 18 is a schematic diagram showing coupling of the embodiment of FIGS. 16 and 17 with a separate water storage reservoir.

While the spray system of FIGS. 16 and 17 may simply be connected to a pressurized water line for use to directly counter roof heating loads, FIG. 18 shows the preferred coupling to a reservoir 170 to facilitate night cooling and storage of a large water mass. Chilled water held in the reservoir 170 may be pumped by cooling pump 172 to blower coils 174 when cooling loads are sensed by building thermostats. The reservoir may be used simply to hold water chilled on the roof, or may also be chilled by auxiliary, compressor-driven cooling equipment at times when the roof water chilling system cannot fully satisfy building cooling loads.

For roof cooling of the stored water, the spray pump 176 draws tank water in at point B and delivers it through the spray heads. The water is cooled above the insulation panels, then drains through panel joints and across the sloping roof to one or more drains. Water then drains back into the storage tank at point A. Rain water follows the same drainage path and causes excess water to overflow and exit the tank at point C. When the building thermostat signals a cooling demand, the cooling pump 172 may draw water through a line 178 connected to the drain at point D for delivery to one or more heat transfer coils 174. After picking up heat at the heat transfer coil(s), water may be returned to the tank 170 at point B. Alternately, cooling of the heat transfer coils may be through piping completely separated from the roof cooling system piping.

The invention has been described with reference to the preferred embodiments, which are intended to be illustrative and not limiting. Various changes may be made without departing from the spirit and scope of the invention as defined in the following claims.

What is claimed is:

1. A roofing system for a structure having a roof deck with upstanding edges about the perimeter of the roof deck, the system comprising:

a waterproof membrane on the roof deck and extending from edge-to-edge;

a reservoir defined by the waterproof membrane and edges and containing a liquid therein;

at least one insulating panel adapted to float on the liquid reservoir and covering the waterproof membrane on the roof deck from edge-to-edge, the at least one panel having an underside surface facing the liquid reservoir and an external surface opposite the reservoir surface for facing a surrounding environment;

pumping means having an inlet within the reservoir and an outlet communicating with the surrounding environment for selectively distributing liquid from the reservoir onto the external surface of the panel;

drain means through the panel and providing communication between the external surface and the reservoir for permitting drainage of liquid on the external surface into the reservoir; and overflow drainage means extending through the roof deck for establishing a desired depth of the reservoir, the overflow drainage means being covered by the external surface of the panel to prevent entry of debris into the overflow drainage means.

2. The system of claim 1, wherein the overflow drainage means includes variable depth support means for selectively adjusting a height of the overflow drainage means above the roof membrane to vary the desired depth of the reservoir.

3. The system of claim 1, wherein the pump means includes a filter for preventing passage of debris from the reservoir to the outlet of the pump means.

4. The system of claim 1, further comprising control means for activating the pumping means at preferred times.

5. The system of claim 1, wherein the reservoir includes piping means for communicating with an air-conditioning system of the structure.

6. The system of claim 1, wherein the reservoir is in heat exchange relationship with an interior of the structure.

7. The system of claim 1, wherein the reservoir is in heat exchange relationship with an air plenum of an air-conditioning system of the structure.

8. The system of claim 1, wherein the external surface includes a layer resistant to ultraviolet degradation.

9. The system of claim 1, wherein the panel is made of a material that resists moisture absorption.

10. The system of claim 1, wherein the at least one insulating panel is a plurality of panels each defining longitudinal edges and lateral edges with a joint between the edges of adjacent panels, each joint functioning as part of the drain means for providing communication between the external surface and the reservoir.

11. The system of claim 10, wherein each joint is sized to permit passage of debris having a size no greater than a predetermined size and to prevent passage of debris having a size larger than the predetermined size.

12. The system of claim 10, wherein each panel of the plurality of panels includes interconnecting means for interconnecting one panel to an adjacent panel.

13. The system of claim 12, wherein the interconnecting means is a spline-in-groove structure in a least one of the longitudinal and lateral edges of each panel.

14. The system of claim 1, wherein the insulating panel includes at least one foot projecting from the underside surface for defining a space between the underside surface and the membrane.

15. The system of claim 1 further comprising an edge cushion extending in a horizontal direction between the upstanding edge and an opposing face of an adjacent insulating panel, the edge cushion being resilient for accommodating horizontal reciprocal movement of the panel toward and away from the edge.

16. The system of claim 15, wherein the edge cushion is integrally mounted on the adjacent insulating panel.

17. The system of claim 15, wherein the roof membrane continuously extends from the roof deck and surrounds an exterior face of the edge cushion extending between the panel and the edge.

18. The system of claim 1 further comprising means for securing the panel in the reservoir.

19. The system of claim 18, wherein the securing means secures the panel to the roof membrane, and includes a slit in the panel, a strap having one end secured to the roof membrane and an opposite end extending through the slit, and a stopper plate located within the opposite end and contacting the external surface of the panel.

20. The system of claim 19, wherein the slit permits drainage of water from the external surface to the reservoir.

21. The system of claim 19, wherein the slit is positioned in the center of the panel.

22. The system of claim 20, wherein the slit is positioned in the center of the panel.

23. The system of claim 18 wherein the securing means is adhesion between the liquid and the panel.

24. The system of claim 1, wherein the overflow drainage means is located in an aperture of the roof deck and extends through the roof deck within a coupling communicating with a drainage system for the structure, the overflow drainage means comprising a drain pipe having a width corresponding to a width of the coupling, and a height of the drain pipe above the roof deck being adjustable to set the desired depth of the reservoir.

25. The system of claim 24, wherein the membrane has an aperture corresponding in location to the aperture of the roof deck, and an edge of the membrane aperture extends into the coupling in the roof deck aperture and is located between the drain pipe and the coupling.

26. The system of claim 25, further comprising a secondary sealing membrane extending over the membrane adjacent the roof deck aperture, the secondary sealing membrane having a first edge on the roof deck and a second edge extending into the coupling for location between the coupling and the drain pipe.

27. The system of claim 26, further comprising a spacer located between the drain pipe and the coupling, the spacer being located between the secondary sealing membrane and the waterproof membrane.

28. The system of claim 1, wherein the panel above the overflow drainage means includes an opening into which the overflow drainage means extends, the panel opening being covered by a cap having an air inlet vent for permitting passage of air through the cap and into the opening.

29. The system of claim 28, wherein the cap includes conduit means for directing liquid into the overflow drainage means.

30. The system of claim 1, wherein the reservoir includes piping means communicating with a sprinkler system on an interior of the structure.

31. The system of claim 1, further comprising refill means for sensing whether a reservoir depth is below a predetermined level and supplying additional liquid to the reservoir in response to detection of the reservoir depth below the predetermined level.

32. The system of claim 1, further comprising mechanical cooling means within the reservoir for cooling the liquid in the reservoir.

33. A roofing system for a structure having a roof deck with upstanding edges about the perimeter of the roof deck, the system comprising:

a waterproof membrane on the roof deck and extending from edge-to-edge;

a reservoir defined by the waterproof membrane and edges and containing a liquid therein;

at least one insulating panel floating in the liquid reservoir and covering the waterproof membrane on the roof deck from edge-to-edge, the at least one panel having a reservoir surface facing the liquid reservoir and an external surface opposite the reservoir surface facing a surrounding environment;

pumping means having an inlet within the reservoir and an outlet communicating with the surrounding environment for selectively distributing liquid from the reservoir onto the external surface of the panel;

drain means through the panel and providing communication between the external surface and the reservoir for permitting drainage of liquid on the external surface into the reservoir;

overflow drainage means for establishing a maximum depth of the reservoir; and edge sealing means between the edges and the insulation panel, the edge sealing means being resilient and extending in a horizontal direction between the upstanding edge and on opposing face of an adjacent insulation panel for accommodating horizontal reciprocal movement of the panel toward and away from the edges.

34. The system of claim 33, wherein the roof membrane continuously extends from the roof deck and surrounds a face of the edge sealing means extending between the panel and the edges.

35. A roofing system for a structure having a roof deck with upstanding edges about the perimeter of the roof deck, the system comprising:

a waterproof membrane on the roof deck and extending from edge-to-edge;

a reservoir defined by the waterproof membrane and edges and containing a liquid therein;

at least one insulating panel floating in the liquid reservoir and covering the waterproof membrane on the roof deck from edge-to-edge, the at least one panel having a reservoir surface facing the liquid reservoir and an external surface opposite the reservoir surface facing a surrounding environment;

pumping means having an inlet within the reservoir and an outlet communicating with the surrounding environment for selectively distributing liquid from the reservoir onto the external surface of the panel;

drain means through the panel and providing communication between the external surface and the reservoir for permitting drainage of liquid on the external surface into the reservoir;

overflow drainage means for establishing a maximum depth of the reservoir; and a flexible strap for securing the at least one panel in the reservoir to the membrane.

36. A roofing system for a structure having a roof deck with upstanding edges about the perimeter of the roof deck, the system comprising:

a waterproof membrane on the roof deck and extending from edge-to-edge;

a reservoir defined by the waterproof membrane and edges and containing a liquid therein;

at least one insulating panel floating in the liquid reservoir and covering the waterproof membrane on the roof deck from edge-to-edge, the at least one panel having a reservoir surface facing the liquid reservoir and an external surface opposite the reservoir surface facing a surrounding environment;

pumping means having an inlet within the reservoir and an outlet communicating with the surrounding environment for selectively distributing liquid from the reservoir onto the external surface of the panel;

drain means in the panel and providing communication between the external surface and the reservoir for permitting drainage of liquid on the external surface into the reservoir;

overflow drainage means for establishing a maximum depth of the reservoir; and an air opening in the panel above the overflow drain means into which the overflow drain means extends, the air opening being covered by a cap having an air inlet vent for permitting passage of air through the cap and into the opening.

37. A roofing system for a structure having a roof deck with upstanding edges about the perimeter of the roof deck, the system comprising:

a waterproof membrane on the roof deck and extending from edge-to-edge;

a reservoir defined by the waterproof membrane and edges and containing a liquid therein;

at least one insulating panel adapted to float on the liquid reservoir and covering the waterproof membrane on the roof deck from edge-to-edge, the at least one panel having an underside surface facing the liquid reservoir and an external surface opposite the underside surface facing a surrounding environment;

drain means through the panel and providing communication between the external surface and the reservoir for permitting drainage of liquid on the external surface into the reservoir; and overflow drainage means extending through the roof deck for establishing a maximum depth of the reservoir, the overflow drainage means being covered by the external surface of the panel to prevent entry of debris into the overflow drainage means.

38. A roofing system for a structure having a roof deck with upstanding edges about the perimeter of the roof deck, the system comprising:

a waterproof membrane on the roof deck and extending from edge-to-edge;

a reservoir defined by the waterproof membrane and edges and containing a liquid therein;

at least one insulating panel above the liquid reservoir and covering the waterproof membrane on the roof deck from edge-to-edge, the at least one panel having an underside surface facing the liquid reservoir and an external surface opposite the underside surface facing a surrounding environment;

pumping means having an inlet within the reservoir and an outlet communicating with the surrounding environment for selectively distributing liquid from the reservoir onto the external surface of the panel;

drain means through the panel and providing communication between the external surface and the reservoir for permitting drainage of liquid on the external surface into the reservoir;

overflow drainage means for establishing a maximum depth of the reservoir, the overflow drainage means being located below the external surface of the panel; and mechanical cooling means within the reservoir for selectively cooling the liquid in the reservoir.

39. A roofing system for a structure having a roof deck with upstanding edges about the perimeter of the roof deck, the system comprising:

a waterproof membrane on the roof deck and extending from edge-to-edge;

at least one insulating panel covering the waterproof membrane on the roof deck from edge-to-edge, the at least one panel having an underside surface contacting the membrane and an external surface opposite the underside surface facing a surrounding environment;

drain means in the panel and providing communication between the external surface and the membrane for permitting drainage of liquid on the external surface onto the membrane; and overflow drainage means extending through the roof deck for draining liquid from the membrane, the overflow drainage means being covered by the external surface of the panel to prevent entry of debris into the overflow drainage means.

40. The system of claim 39 further comprising means for securing the at least one panel to the membrane.

41. The system of claim 40 wherein the securing means comprises a flexible strap secured to the membrane and the at least one panel.

42. The system of claim 40 wherein the securing means comprises a flexible strap secured to the roof membrane and the at least one panel, the strap being located on the membrane underneath an edge of the panel.

43. The system of claim 42 wherein two adjacent panels are provided, and the strap is secured to both the adjacent panels.

44. The system of claim 39 further comprising spray cooling means for distributing a liquid onto the external surface of the panel.

45. The system of claim 44, wherein the spray cooling means includes conduits connected to a water source, the conduits being located on the external surface of the panel.

46. The system of claim 44 further comprising a water reservoir communicating with the spray cooling means and the overflow drain means.

47. The system of claim 46 wherein the reservoir includes piping means for providing communication between the water reservoir and an air conditioning system for the structure to direct water in a heat exchange relationship between the reservoir and air condi system.

48. The system of claim 45, further comprising panel securing means for securing the at least one panel to the membrane, the spray cooling means also being retained by the panel securing means.

49. A roofing system for a structure having a roof deck with upstanding edges about the perimeter of the roof deck, the system comprising:

a waterproof membrane on the roof deck and extending from edge-to-edge;

a reservoir defined by the waterproof membrane and edges and containing a liquid therein;

a plurality of insulating panels adapted to float in the liquid reservoir and covering the waterproof membrane on the roof deck from edge-to-edge, each panel having an underside surface facing the liquid reservoir and an external surface opposite the reservoir surface for facing a surrounding environment;

pumping means having an inlet within the reservoir and an outlet communicating with the surrounding environment for selectively distributing liquid from the reservoir onto the external surface of the panels;

drain means through the panels and providing communication between the external surface and the reservoir for permitting drainage of liquid onto the external surface into the reservoir;

overflow drainage means for establishing a desired depth of the reservoir, the overflow drainage means being located below the external surface of the panel;

each panel defining longitudinal edges and lateral edges with a joint between the edges of adjacent panels, each joint functioning as a part of the drain means for providing communication between the external surface and the reservoir; and each panel of the plurality of panels including interconnecting means along at least some of the longitudinal and lateral edges for interconnecting the longitudinal and lateral edges of one panel to opposing longitudinal and lateral edges of an adjacent panel.

50. The roofing system of claim 49, wherein the interconnecting means includes a groove in at least some of the longitudinal and lateral edge of the panels for receiving a projection extending from at least some of the longitudinal and lateral edges of an adjacent panel.

51. The roofing system of claim 12, wherein the interconnecting means is a tongue and groove structure in at least some of the longitudinal and lateral edges of each panel.

* * * * *